Sept. 22, 1953 M. CAMRAS 2,653,189

ELECTROMAGNETIC TRANSDUCER HEAD

Filed Feb. 12, 1948 2 Sheets-Sheet 1

Inventor
MARVIN CAMRAS by The Firm of Charles W. Hills Attys,

Sept. 22, 1953 M. CAMRAS 2,653,189

ELECTROMAGNETIC TRANSDUCER HEAD

Filed Feb. 12, 1948 2 Sheets-Sheet 2

Inventor
MARVIN CAMRAS by Attys.

Patented Sept. 22, 1953 2,653,189

UNITED STATES PATENT OFFICE 2,653,189

ELECTROMAGNETIC TRANSDUCER HEAD

Marvin Camras, Chicago, Ill., assignor to Armour Research Foundation of Illinois Institute of Technology, Chicago, Ill., a corporation of Illinois Application February 12, 1948, Serial No. 7,931

4 Claims. (Cl. 179—100.2)

My invention relates to electromagnetic transducer heads for use in magnetic recorders and like equipment.

In one method of recording an intelligence on a lengthy magnetizable record medium such as, for example, a paper tape having a coating of magnetizable particles on one face thereof, the lengthy magnetizable medium is drawn across an electromagnetic transducer head assembly at predetermined constant speed. The electromagnetic transducer head includes a magnetic core member defining a non-magnetic gap and having adjacent portions shaped to receive the lengthy magnetizable medium. A coil or winding encircles this core to cause a magneto-motive force across the gap in accord with the instantaneous value of current flow therein. As each incremental portion of the lengthy magnetizable record medium travels across the electromagnetic transducer head, a degree of magnetization is imparted thereon in accord with the magnitude in the current flow in the coil at that instant, thereby imparting variations in the degree of magnetization along the length of the medium in accord with the time variations of the intelligence recorded.

During reproduction, the foregoing process is reversed and the magnetized record medium is drawn at the recording speed over a similar electromagnetic transducer head assembly. As each incremental length of the record medium rides over the gap portion of the electromagnetic transducer head, flux is created along the core member thereof in accord with the degree of magnetization imparted to the particular incremental portion of the record medium directly over the non-magnetic gap. This flux, varying in time in accord with the time variations of the intelligence, creates an induced voltage in the winding which may be amplified and suitably converted to the original form of the intelligence such as, for example, sound.

In order most effectively to utilize the lengthy magnetizable medium, it is highly desirable to have an electromagnetic transducer head assembly with a high degree of resolution. In other words, the incremental portion of the lengthy magnetizable record medium which is acted upon by the non-magnetic gap of the electro-magnetic transducer head, or which is effective to determine the flux therein, should be as short as possible, to the end that the velocity of the medium necessary accurately to record an intelligence having predetermined frequency components may be minimized.

Heretofore efforts have been made to improve resolution by merely reducing the size of the air gap of the head without other changes. It has not been appreciated that this expedient of itself accomplishes the objective of improved resolution at the expense of recorded noise, microphonic noise, and distortion. Some of these objections may be overcome by use of separate pickup and record heads, each designed most effectively to achieve its specialized purpose. However, this expedient complicates the magnetic recorder and increases the cost thereof and, moreover, sacrifices some resolution because the shape and alignment of the record and playback pole pieces can never be perfect.

In accordance with the present invention these objectives are achieved by designing the head with a very small core.

In addition to the foregoing advantages, the small electromagnetic transducer of the present invention is self-supporting and may readily and conveniently be mounted on a magnetic recorder. The small size further acts to minimize the hum pickup of the structure due to stray magnetic fields and reduces the microphonic noise associated with mechanical disturbance of the core material. Light weight is further advantageous if the head is intended to bear against a rotary stabilizer type unit wherein the head urges the medium against the surface of a massive rotating member.

Moreover, it has heretofore been considered necessary to use a relatively high frequency current to achieve the magnetic erasing necessary to place the magnetizable record medium in a neutral condition preparatory to recording an intelligence thereon. This high frequency has been regarded as necessary in order that the frequency of the erasing current be very great as compared to the signal current, thereby to avoid interference between the recorded erase signal and the reproduced signal voltage. Similar considerations have dictated the use of a bias current of very high frequency as compared with the frequency of the recorded intelligence.

Still another desirable feature of an electromagnetic transducer head assembly is that it is easy and inexpensive to manufacture, a requirement that dictates simplicity of construction and a minimum number of parts.

In accordance with the present invention an improved electromagnetic transducer head assembly having sharp resolution and which may be used with relatively low frequency bias and erase currents is provided.

It is therefore a general object of the present invention to provide an improved electromagnetic transducer head assembly.

Still another object of the present invention is to provide an improved electromagnetic transducer head assembly having high resolution.

Another object of the present invention is to provide an improved electromagnetic transducer head operable both as a record head and a playback head.

Further, it is an object of the present invention to provide an improved electromagnetic transducer head assembly having high resolution while still being capable of recording an intelligence on a lengthy magnetizable medium with a minimum degree of noise.

Yet another object of the present invention is to provide an improved electromagnetic transducer head assembly capable of obliterating previous recordings and other magnetizations on a lengthy magnetizable record medium by use of a relatively low frequency current.

Still another object of the present invention is to provide a small unitary electromagnetic transducer head assembly capable of being mounted on a spring member to be urged against the portion of a magnetic record medium received on a rotary stabilizer.

My invention further resides in features of construction, combination and arrangement wherein an improved electromagnetic transducer head of small size and operative with small temperature rise and high efficiency is provided.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings, in which:

Figure 1:
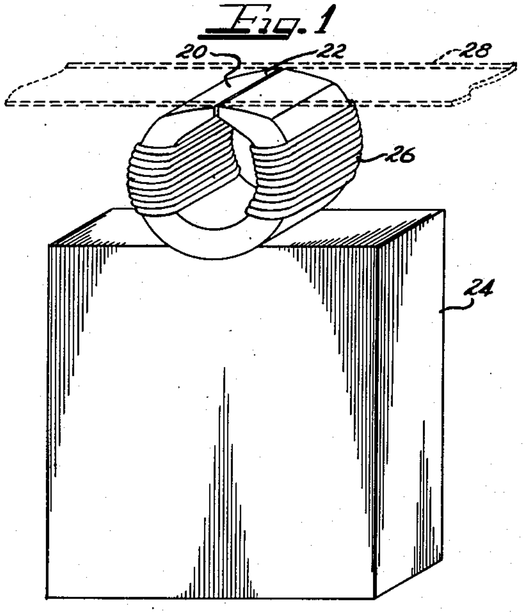
Figure 1 is a greatly enlarged isometric view of an electromagnetic transducer head assembly constructed in accordance with the principles of the present invention.
Figure 2:
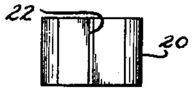
Figures 2 and 3 are top plan and side elevational views respectively of the magnetic core portion of the assembly shown in Figure 1.
Figure 3:
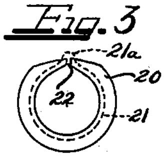

Referring now to the isometric view of Figure 1, there is shown an electromagnetic transducer head assembly including a magnet core portion 20 which defines a closed loop for magnetic flux, which loop has a non-magnetic gap 22. A typical flux path in core 20 is indicated at 21 (Figure 3). The core 20 is formed in a somewhat circular shape, and at its portion opposite the gap 22 is imbedded in the relatively large block 24 of copper or like material having good thermal conductivity. As is best seen in Figure 1, the energizing winding 26 encircles the opposed leg portions of the core 22 so that current flow through this winding produces flux in the core 20 and magneto-motive force across the non-magnetic gap 22.

The portions of core 20 adjacent gap 22 are adapted to receive a strip or tape of lengthy magnetizable medium as indicated in the dotted lines at 28. This magnetizable record member may, for example, comprise a strip of magnetically inert material such as, for example, paper tape, upon which is deposited a coating of magnetizable particles. Means (not shown) is provided to cause the medium 28 to travel over the core 20 and across the non-magnetic gap 22.

The winding 26 is wound on the portions of core 20 adjacent the portions which receive medium 28. If it is desired to impart variations to the degree of magnetization of medium 28 along its length in accord with the time variations of an intelligence, that intelligence is converted to a suitable time-varying electro-motive force as, for example, by the use of a microphone and amplifier. This time-varying electromotive force is applied to the winding 26 to cause current flow therethrough in accord with the time variations of the intelligence, thereby setting up a time-varying magneto-motive force across the non-magnetic gap 22. This magneto-motive force causes fringing fluxes about the edges of the non-magnetic gap 22 which in part pass through the magnetizable coating of the incremental portion of the medium 28 immediately thereover. The portion 21*a* of the flux line 21 (Figure 3) constitutes part of this fringing flux that acts upon the medium 28. This results in imparting magnetization to successive incremental portions of medium 28 in accord with the magnitude of the current flow in winding 26 as that medium travels thereover. In this fashion variations in the degree of magnetization along the length of the medium 28 are imparted in accord with the time variations of the intelligence to be recorded.

When it is desired to erase the medium 28 irrespective of previous magnetic recordings thereon or the magnetic history of that medium, the winding 26 may be excited with high frequency current flow and the medium 28 drawn thereover. In this case, each incremental portion of the medium 28, as it travels across the non-magnetic gap 22, is subjected to several cycles of alternating magneto-motive force and, as a consequence, leaves the core 20 in a substantially neutral magnetic condition.

In a practical electromagnetic transducer head constructed as shown in Figure 1, the non-magnetic gap 22 may be of the order of .005 inch if used as an erase head, .0005 to .002 inch if used as a record head, and .0001 to .0005 inch when used as a playback head. The core 20 may be a single piece of nickel-iron alloy, such as Permalloy, .015 inch thick in the radial direction and formed to approximately .09 inch inner radius. The winding 26 might comprise 20 turns of No. 30 wire. Moreover, the block 24 may be a copper block one-half inch deep, three-eighths inch across, and one-eighth inch thick.

Actual pick-up heads constructed in accord with the foregoing having non-magnetic gaps of about 0.0005 inch have a ratio of average length of the flux path in the core to the length of the non-magnetic gap of approximately 700. Actual record heads constructed in accord with the foregoing having non-magnetic gaps of about 0.001 inch have a ratio of average length of the flux path in the core to the length of the non-magnetic gap of approximately 300. It has been found that with larger gaps, such as 0.002 inch, the ratio of flux path length in the core to the length of the non-magnetic gap can be increased to approximately 700 without sacrifice in noise level. On the other hand, when extremely high resolution is desired, as may be obtained by using gaps of 0.0005 inch or less, then a ratio of flux path length in the core to the length of the non-magnetic gap of approximately 1000 is procured in practical heads. Gaps as small as 0.0002 inch have been used with a corresponding ratio of about 2500.

In all of the foregoing, good resolution is achieved with slight sacrifice in noise level, even though the gaps are in many instances very much smaller than any gap heretofore considered practical.

The block 24 serves to remove the heat generated in the coil 26 and the core 20 and thus prevents overheating of the head. Moreover, this block forms a convenient method of supporting the head. This block is particularly useful in the case of erase operation where the heat generated within the very small head of the present invention would cause overheating unless removed by a very effective heat conducting and dissipating mechanism.

Further, to reduce the length of the core 20 relative to the non-magnetic gap 22, the core may be made of substantially circular or O-shaped cross-section, as seen in Figure 3. This form provides maximum space for the winding 26 relative to the length of the flux paths such as, for example, flux path 21.

Figure 9:
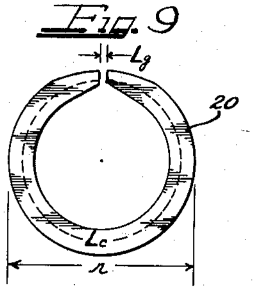
Figure 9 is a diagrammatic view illustrating the structure of the present invention for purposes of explanation.
Figure 10:
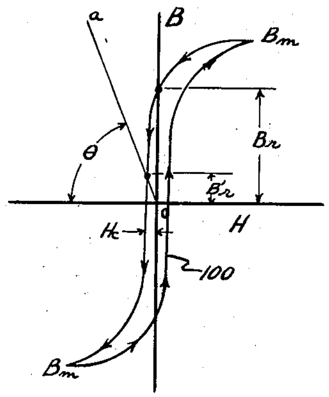
Figure 10 is a hysteresis loop diagram illustrating the operation of the structure of the present invention.

The operation of the electromagnetic transducer head assembly of the present invention may best be understood by reference to Figures 9 and 10. In the latter figure, there is shown a hysteresis curve of the magnetic core material of which the core of the head is made and at the magnetizations encountered during typical operation. Increased values of the abscissas (H) of this curve represent increased magnetizing forces, whereas increased values of the ordinates (B) represent increased flux densities within the core. During a typical alternating cycle, as the magnetizing force (H) is increased in the direction of the arrow, Figure 10, the flux density increases to a peak value $B_m$ from which value this flux density decreases as the magnetizing forces subsequently decrease. This is shown in curve 100, Figure 10. This continues until a maximum flux density value in the negative direction ($-B_m$) is reached, at which time the magnetizing force increases to cause the medium to follow the other leg of the curve.

The example of Figure 10 corresponds to nearly saturating the core. At lower values of applied field a similar curve will be obtained.

Curve 100 (Figure 10) applies to a magnetic circuit comprising the core material alone and indicates that after a peak value of magnetizing force there remains a residual flux density $B_r$ upon reduction of that magnetizing force to zero. It is this flux density, or retained magnetization, that is responsible for noise and other undesirable effects associated with the operation of an electromagnetic transducer head containing an iron core magnetic circuit.

The effect of providing the air gap in the magnetic circuit on the residual magnetization is graphically indicated by the line OA (Figure 10). It can be shown that with an average core length path $L_c$ (Figure 9) and an air gap length of $L_g$ (Figure 9) the value of the remnant magnetization ($B'_r$) is determined by the intersection with the curve 100 of the line OA drawn at an angle $\theta$ whose tangent is equal to $$\frac{L_c}{L_g}$$

Moreover, if the value of $\theta$ is small, it can further be shown that with practical core materials the value of remnant magnetization ($B'_r$) is proportional to the coercive force imparted to the material times the ratio of $L_c$ to $L_g$.

The term "average core length path" as used herein signifies the weighted average length of the various flux paths encircling core 20, taking into account the quantity of flux following each path.

In order effectively to utilize the magnetic materials on the recording medium, it is necessary to use a recording field of intensity varying from 50 to 200 gauss at the portion of the medium being magnetized. However, with typical electromagnetic transducer heads constructed in accordance with the principles of the prior art, it has been found that the actual value of $B'_r$ varies from approximately 50 gauss to approximately 300 gauss with a typical value of about 150 gauss. Consequently, the intensity of the residual magnetization in the core portion of the head is comparable in magnitude to the actual recording field. With values so nearly alike, I have discovered that a particularly unfavorable situation is created from the standpoint of noise in reproduction and even harmonic distortion.

In contrast to the structures of the prior art, a typical head construction in accordance with the principles of the present invention has a ratio of $L_c$ to $L_g$ of approximately one-fifth to one-tenth of the ratio heretofore used. This gives values of $B_r$ after saturation varying below 5 gauss in the case of a very good core material and a relatively long gap to approximately 15 gauss in the case of a poorer core material and a relatively short gap, with approximately 8 gauss as a typical figure.

A core material with coercive force below 0.1 oersted, and preferably below 0.03 oersted, is desirable.

By reducing the ratio of $L_c$ to $L_g$ to the point wherein the value of $B_r$ is less than 15, it has been found that the noise introduced by reason of this residual magnetization is rendered very small as compared to the noise otherwise existing. Moreover, for best operation the value of $B_r$ should be below 5, and for high fidelity recording this value should be kept below 2.5. For playback, about twice these figures (30, 10 and 5 respectively) have been found tolerable.

The foregoing values can be obtained by restricting the length of the magnetic path in iron to a value less than one inch, corresponding to a core ¼ inch square, and preferably less than ¾ inch. Heretofore heads have been constructed without regard to small size of the iron path and generally have involved iron paths considerably in excess of these figures.

Figure 4:
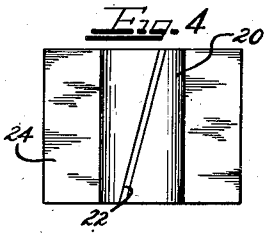
Figures 4 and 5 are top plan and side fragmentary elevational views respectively of the core and support portions of an electromagnetic transducer head assembly for magnetically erasing a traveling record medium and constructed in accordance with the principles of the present invention.
Figure 5:
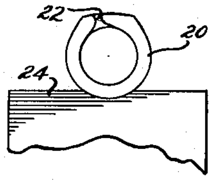

In accordance with a further feature of the present invention, the gap 22 is tilted relative to the direction of motion of the medium 28 and the record and playback electromagnetic transducer therewith. Figures 4 and 5 are a plan view and a side elevational view respectively of an electromagnetic transducer head for erase purposes constructed in this fashion but with the windings removed.

In accordance with the present invention, effective elimination of the high frequency bias voltage from the erased record is achieved by tilting the gap 22 of the erase head relative to the perpendicular to the direction of movement of the medium. This results from the fact that the incremental portions of the medium 28 immediately adjacent the erase head gap 22 are spaced relative to each other along the length of the medium 28, thus causing phase displacements in the recorded wave over the width thereof when viewed in direction transverse to the length. Consequently, when a record or pick-up head aligned with the perpendicular to the direction of motion of medium 28 is used, various portions of the medium 28 produce out-of-phase voltages which, by proper design, may be made to produce no net voltage in the pick-up head.

Moreover, by tilting the erase head relative to the perpendicular to the direction of movement of the medium, the random noise in the picked up sound or other intelligence has been found to be greatly reduced.

It can be shown that with an erase head having a non-magnetic gap 22 at an angle to the non-magnetic gap of the pick-up head, the oscillations recorded by the erase head will produce zero voltage in the pick-up head when the non-magnetic gaps are at an angle such that the phase difference from one side of the gap of the pick-up head to the other is a full wave length or an integral multiple thereof. Thus, for example, if 20 kilocycles erase frequency is used and the medium 28 is ⅛-inch wide and moves at a speed of 12 inches per second, effective cancellation of the erase voltage can be achieved with the gap 22 of the erase head at an angle of approximately 0.3° relative to the orientation of the gap of the pick-up head. Thus, if the pick-up head is mounted with its non-magnetic gap directed transversely to the direction of travel of medium 28, the erase head is mounted with its non-magnetic gap rotated 0.3° relative thereto; thus causing a phase difference of a full wave length across the medium 28 as seen from a line drawn transverse to the direction of motion thereof. As pointed out hereafter, if the angle of tilt corresponds to several or more wavelengths, it is not critical.

Figure 6:
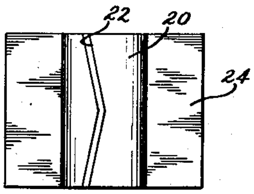
Figure 6 is a top plan view like Figure 4, but showing another embodiment of the present invention.

In the herringbone construction of Figure 6, effective cancellation of the erase wave is achieved when each half of the non-magnetic gap produces a phase displacement over the width of the medium of a full wave length or an integral multiple thereof.

Figure 13:
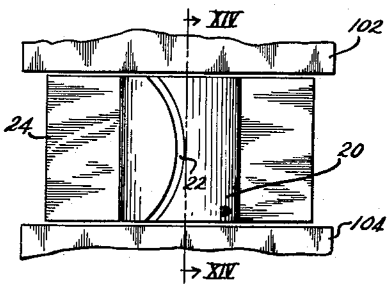
Figure 13 is a top plan view of still another embodiment of the transducer head of the present invention and showing elements to guide the record medium in the portions where it overlaps the edges of the head.

There is shown in Figure 13 a top plan view of an electromagnetic transducer head like that of Figure 6 but in which the gap 22 is curved to give a result similar to that associated with tilting the gap. It will, of course, be evident that other arrangements may be used for this purpose as, for example, a combination of straight and curved gaps.

While the preceding discussion has been limited to tilting or bending the erase head gap relative to the perpendicular to the direction of movement of the medium, it will, of course, be apparent that the critical factor is the tilt of the erase head relative to the playback head.

Figure 7:
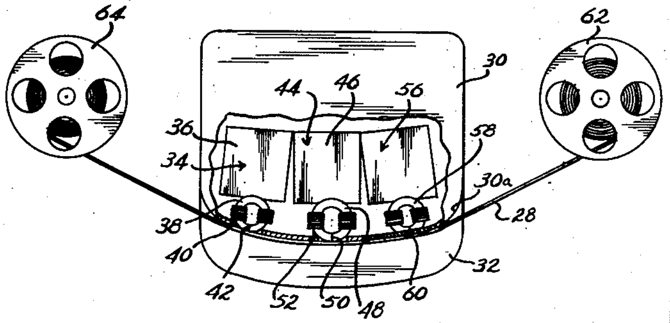
Figure 7 is a top plan view of a unitary electromagnetic transducer head assembly constructed in accordance with the principles of the present invention for imparting magnetization along two tracks of a lengthy traveling magnetizable record medium.
Figure 8:
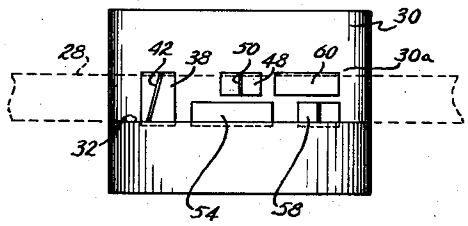
Figure 8 is a front elevational view of the mechanism of Figure 7.

Figures 7 and 8 are broken-away top plan and front elevational views respectively of a complete unitary electromagnetic transducer head assembly suitable for use in a magnetic recorder of the type wherein two channels of a lengthy magnetizable record medium are employed, one channel carrying intelligence different from that carried by the other. Such a head may, for example, be used in binaural system. This assembly includes a housing 30 of suitable insulating material such as, for example, a phenol-formaldehyde condensation product. The housing 30 has a forward wall **30*a* extending down the front portion of the same and terminating in the horizontal shelf portion 32 which defines a ledge to receive and guide the lengthy magnetizable medium 28. Three electromagnetic transducer head assemblies constructed in accord with the principles of the present invention are received in the housing 30 with their pole pieces facing outwardly of the forward wall 30*a* and received in suitable openings therein to ride against the medium 28. One of these electro-magnetic transducer head assemblies, indicated generally at 34, is an erase head utilizing copper block 36 upon which is supported the core 38 which in turn supports the winding 40. The non-magnetic gap 42 defined by the core 38 faces outwardly of the wall 30*a* to receive the medium 28 as it travels thereover. As seen best in the front view of Figure 8, the core 38 defines a tilted air gap 42 extending across the entire active face of the medium 28**.

The electromagnetic transducer head shown generally at 44 includes the copper block 46 upon which is mounted the core 48 which defines the non-magnetic gap 50 which is positioned to engage the medium 28 as it travels along the wall **30*a*. Windings 52 are disposed on the opposed leg portions of the core 48**.

The core 48 extends over only the upper half of the active width of the medium 28 and is thus effective to magnetize or reproduce from only that portion of the medium 28. A keeper member 54 of soft iron is mounted adjacent the core 48 and in slightly spaced relationship therewith to confine the magnetic field associated with current flow in winding 52 to the portions of the core 48 upon which they act. Moreover, this keeper member prevents induced voltages in the winding 52 associated with magnetization in the opposite half of the medium 28 as it travels over the head assembly.

The electromagnetic transducer head 56 is like head 44 except that it is disposed to coact with the lower half of the magnetizable portion of medium 28 as it is seen best in Figure 8. A keeper member 60 is mounted in alignment with the core 58 and in slightly spaced relationship therewith to confine the effects of that core to the lower portion of the lengthy magnetizable medium.

From the foregoing it will be evident that when the medium 28 travels from left to right as is seen in Figures 7 and 8 and the windings 40 of head 34 are energized with suitable high frequency erase currents, the magnetization on medium 28 is erased and the entire face of that medium prepared for recording. Simultaneously, a time varying current flowing in accord with the intelligences may be caused to take place in the windings of head 44 and head 56. The tilt of the non-magnetic gap 42 of head 34 is proportioned relative to the velocity of the medium 28 and the frequency of the erase current flow to cause a phase difference over each half of the width of medium 28 substantially equal to an integral number of full wave lengths, thus preventing any pick-up of the erase voltages by the heads 44 and 56.

By tilting the gap 42 of erase head 38 by an angle corresponding to a phase difference of several or more wave lengths, any error in the tilt causes negligible pick-up voltage and, moreover, the tilt is more effective to reduce random noise. This results from the fact that the magnitude of the induced voltage associated with such error becomes very small as a large number of wavelengths are involved.

The medium 28 is drawn across the assembly 30 by rotating reels 62 in the wind-up direction. This can be accomplished by an electric motor or other suitable means (not shown). Preferably a brake or other device (not shown) is provided to oppose rotations of the reel from which medium 28 is unwound to maintain medium 28 taut in the region between these reels.

By eliminating any effects associated with the erase current flow, I am able to use a much lower frequency erase current than would otherwise be possible, and even to use an erase current that is in the audible range. Moreover, it will be apparent to those skilled in the art that if a high frequency bias voltage is applied during recording and that voltage is in the audible range, proper tilting of the record gap relative to the pick-up gap subsequently used to pick up the intelligence may eliminate any audible signal resulting therefrom. In addition, the record gap may be tilted relative to the pick-up gap to provide a degree of control over the frequency characteristics of the voltage induced in the pick-up head to equalize disturbances in the frequency response otherwise encountered.

An erase head operating at lower frequency has the advantage of permitting greater air gap fluxes and lower losses. Moreover, it is less difficult to saturate the magnetizable record medium at low frequencies.

Figure 11:
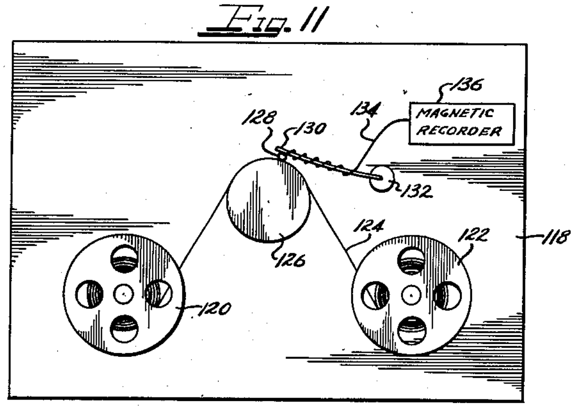
Figure 11 is a diagrammatic top plan view of a complete magnetic recorder utilizing the electromagnetic transducer head of the present invention and a rotary stabilizer.

Figure 11 shows an electromagnetic transducer head of the present invention incorporated in a complete magnetic recorder. As indicated, the recorder includes a panel 118 upon which reels 120 and 122 are disposed. The medium 124 extends between these reels and is received by the capstan 126. Drive elements (not shown) are provided to maintain the medium 124 taut between the reel 120 and capstan 126 and between capstan 126 and reel 122. An electromagnetic transducer head 128, like that shown in Figure 1 but without the block 24, is mounted on the resilient arm 130 to bear against the medium 124 and urge it against capstan 126. The arm 130 is supported by post 132 and is flexed in the position shown to provide pressure between medium 124 and head 128. The wires 134 from the head 128 lead to the recorder 136 and may, as shown, be wound about the spring 130 to avoid interfering with movement of that spring.

Preferably, the capstan 126 includes a massive weight which acts to maintain the rotational velocity thereof constant despite accelerating or decelerating forces. Consequently, the medium 124 is moved at a constant velocity across the head 128 and there is no opportunity for this velocity to deviate because of the direct engagement between the head 128 and the portion of the medium 124 bearing against capstan 126. The operation of the capstan 126 as a rotary stabilizer is more fully described in my Patent No. 2,418,543 entitled "Magnetic Recording and Reproducing Device," assigned to the same assignee as the present invention.

The electromagnetic transducer head of the present invention has a very great advantage when used in conjunction with the structure of Figure 11 inasmuch as it is light in weight and consequently does not create any substantial inertial opposition to movements of the tip of the spring arm 130. Consequently, the natural resonant frequency of the spring 130 with the weight of the head 128 is very high and the entire unit follows any variations in the medium as it travels thereover.

Figure 14:
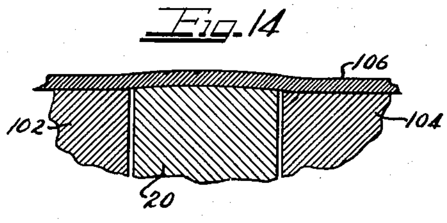
Figure 14 is a cross-sectional view through the axis of XIV—XIV, Figure 13.

In view of Figure 13, the head structure is disposed between two guide members 102 and 104 which receive the overhanging edges of the medium as it travels over the head. In accordance with one feature of the present invention, the surface of the core 20 in the region where it bears upon the medium is domed to rise above the surface of the members 102 and 104 to cause the medium to bear snugly against the head 20. This structure is best seen in Figure 14 which is a cross-sectional view through the axis XIV—XIV of Figure 13, but which, in addition, shows the medium 106 in cross-section. As will be evident from this view, the surface of the core 20 is domed in the direction of the cross-section and defines a surface to engage the medium 106 in such fashion as to tend to maintain the medium in snug abutting relationship relative thereto.

Figure 12:
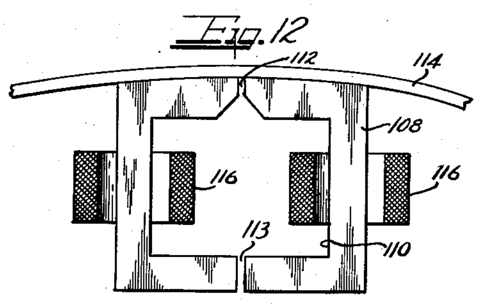
Figure 12 is a side elevational view with parts in cross section of an alternate form of the electromagnetic transducer head of the present invention.

While the principles of the present invention may be, in general, more effectively practiced by the use of an O-shaped head, such as that shown in Figure 1, it is possible, of course, to use a rectangular head. Such a head is illustrated in Figure 12 and includes a core member 108 having a rectangular window 110 and a slot 112 defining a magnetic circuit having an air gap. The medium 114 rides across the air gap defined by slot 112 and variations in magnetization are thereby imparted thereto. The winding 116 controls the flux density in the core 110.

Moreover, as shown in Figure 12, an auxiliary non-magnetic gap 113 may be used. Such gap facilitates winding the head, reduces hum pick-up from stray fields, and even further reduces residual magnetization.

By the term "record playback head" I refer to an electromagnetic transducer head intended to record intelligence on a moving magnetizable record medium or to reproduce intelligence therefrom, or both, as distinguished from an erase head intended merely to restore a magnetizable medium to uniform state of magnetization.

In the foregoing specification and the appended claims I have used the term "magnetic recorder" to designate equipment operable to impart variations to the degree of magnetization of a magnetizable medium along its length in accord with the time variations of the intelligence, equipment operable to reproduce as a time variation the variations in magnetization along the length of a magnetizable medium, equipment operable to erase variations in the degree of magnetization of a medium to restore it to a magnetically neutral condition, or equipment selectively operable to do one or more of the foregoing operations.

I use the term "magnetic" herein to designate material having a high value of permeability as compared to unity, the permeability of air.

By the term "principal dimension" in the foregoing specification and accompanying claims, I refer to the largest dimension of the electromagnetic transducer head assembly. With the head of the present invention, without the block 20 (Figure 1) this dimension is only a few tenths of an inch. This dimension is a measure of the mass of the head and the ability of the head effectively to operate with the structure of Figure 11.

Portions of the invention herein disclosed and claimed are also described in my copending application Serial No. 583,317, filed March 17, 1945, now issued as Patent No. 2,479,308.

While I have shown particular embodiments of my invention, it will, of course, be understood that I do not wish to be limited thereto since many modifications may be made without departing from the spirit and copy of my invention. I, of course, contemplate by the appended claims to cover all such modifications as fall within the true spirit and scope of my invention.

I claim as my invention:

1. A unitary electromagnetic transducer head assembly comprising a member to receive a lengthy magnetizable record medium for travel in a predetermined direction thereover, a magnetic head having a magnetic core defining a non-magnetic gap whose transverse plane is disposed at an acute angle with respect to the direction of movement of said medium, said core being mounted to engage said medium as said medium travels over said member, and an electromagnetic transducer head having a core defining a non-magnetic gap whose transverse plane is disposed substantially at right angles with respect to the direction of travel of said medium and positioned to engage said medium as it travels over said member.

2. A unitary electromagnetic transducer head assembly comprising a member to receive a lengthy magnetizable record medium for travel in a predetermined direction thereover, a magnetic head having a magnetic core defining a non-magnetic gap whose transverse plane is disposed at an acute angle with respect to the direction of movement of said medium, said core being mounted to engage said medium as said medium travels over said member, and an electromagnetic transducer head having a core defining a non-magnetic gap whose transverse plane is disposed substantially at right angles with respect to the direction of travel of said medium and positioned to engage said medium as it travels over said member, means to excite said magnetic head with alternating current of predetermined frequency, means to excite said transducer head with the signal to be recorded, the relative difference in angular orientation of said gaps of said two heads being such that the variation in magnetization imparted by said magnetic head differs in phase by many wave lengths of said signal across said gap of said transducer head.

3. A unitary electromagnetic transducer head assembly comprising a member to receive a lengthy magnetizable record medium for travel in a predetermined direction thereover, a magnetic head having a magnetic core defining a non-magnetic gap whose transverse plane is disposed at an acute angle with respect to the direction of movement of said medium, said core being mounted to engage said medium as said medium travels over said member, and an electromagnetic transducer head having a core defining a non-magnetic gap whose transverse plane is disposed substantially at right angles with respect to the direction of travel of said medium and positioned to engage said medium as it travels over said member, the non-magnetic gap of said transducer head being substantially 0.001 inch, the average length of the flux path in the core of said transducer head being approximately 300 times the length of the flux path across the last-mentioned gap, and the material of the core of said transducer head having a coercive force of less than 0.1 oersted.

4. A unitary electromagnetic transducer head assembly comprising a member to receive a lengthy magnetizable record medium for travel in a predetermined direction thereover, a magnetic head having a magnetic core defining a non-magnetic gap whose transverse plane is disposed at an acute angle with respect to the direction of movement of said medium, said core being mounted to engage said medium as said medium travels over said member, and an electromagnetic transducer head having a core defining a non-magnetic gap whose transverse plane is disposed substantially at right angles with respect to the direction of travel of said medium and positioned to engage said medium as it travels over said member, the material of the core of said transducer head having a coercive force of less than 0.1 oersted, the non-magnetic gap of said transducer head varying within the range of from substantially 0.0005 inch to 0.002 inch, and the average length of the flux path in the core of said transducer head being no greater than 700 times the length of the flux path across the gap thereof.

MARVIN CAMRAS.

References Cited in the file of this patent

UNITED STATES PATENTS

| Number | Name | Date |
|---|---|---|
| 2,361,752 | Eilenberger | Oct. 31, 1944 |
| 2,413,108 | Latchford | Dec. 24, 1946 |
| 2,418,543 | Camras | Apr. 8, 1947 |
| 2,429,792 | Begun | Oct. 28, 1947 |
| 2,431,540 | Camras | Nov. 25, 1947 |
| 2,432,162 | Jones | Dec. 9, 1947 |
| 2,469,444 | Roys | May 10, 1949 |
| 2,479,308 | Camras | Aug. 16, 1949 |

FOREIGN PATENTS

| Number | Country | Date |
|---|---|---|
| 69,273 | Norway | May 28, 1945 |
| 591,368 | Germany | Jan. 19, 1934 |
| 612,489 | Germany | Apr. 25, 1935 |
| 677,613 | Germany | June 29, 1939 |